United States Patent [19]

Shriver

[11] 3,958,766

[45] May 25, 1976

[54] CUTTERHEAD ROTATING MECHANISM FOR FORAGE HARVESTER

[75] Inventor: Joe E. Shriver, East Earl, Pa.

[73] Assignee: Sperry-New Holland Sperry Rand Corporation, New Holland, Pa.

[22] Filed: June 2, 1975

[21] Appl. No.: 583,067

[52] U.S. Cl............................. 241/101.2; 51/249
[51] Int. Cl.².................................... B24B 19/00
[58] Field of Search................ 241/101.2, 101.3; 83/174; 51/246, 247, 249

[56] References Cited
UNITED STATES PATENTS

| 3,328,924 | 7/1967 | Ward | 51/249 |
| 3,581,446 | 6/1971 | Witt et al. | 51/249 |
| 3,724,139 | 4/1973 | Leverenz | 51/249 |
| 3,811,232 | 5/1974 | Reuter | 51/249 |

Primary Examiner—Granville Y. Custer, Jr.
Attorney, Agent, or Firm—C. Hercus Just; Frank A. Seemar; John R. Flanagan

[57] ABSTRACT

A forage harvester having a rotatable cutter head coacting with a shear bar is provided with means to rotate the cutter head stepwise for inspection of the knives of the cutter head without manually engaging the same. The means for advancing the cutter head also provide tension applied against the knives of the cutter head incident to the same being ground by a rotatable grinding wheel to re-bevel the surfaces of the knives adjacent the cutting edges thereof for purposes of producing effective operating engagement of said grinding wheel with said knives during such re-bevelling of the same.

7 Claims, 8 Drawing Figures

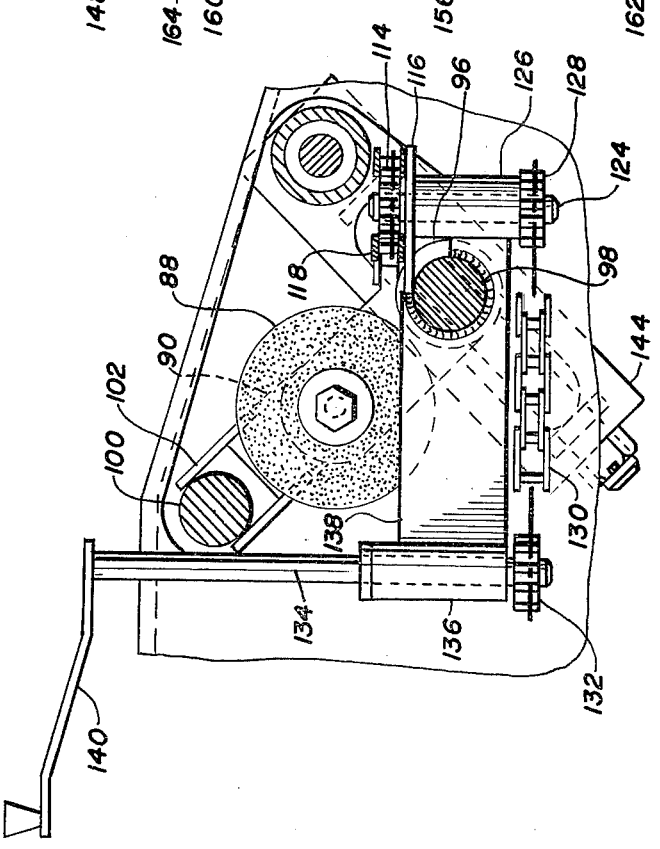

CUTTERHEAD ROTATING MECHANISM FOR FORAGE HARVESTER

CROSS REFERENCE TO RELATED APPLICATION

The invention comprising the subject matter of the present application is related to a co-pending application filed on even date herewith Ser. No. 588,095, in the names of Ben H. Snavely and David D. Stoltzfus, entitled Grinding Wheel Guide Means for Forage Harvester, and commonly assigned therewith to the same assignee.

BACKGROUND OF THE INVENTION

Forage harvesters of the type to which the present invention pertains employ relatively heavy and large rotatable cutter heads having a plurality of knives thereon which are spaced even distances circumferentially. It is common practice to arrange said knives upon the periphery of the cutter heat at an angle to the axis thereof as well as at an angle to the shear bar, it being understood that the shear bar normally is mounted stationarily within the harvester in parallel relation to the periphery of the cutter head, whereby during the shearing operation, no sudden shock is imposed upon the knives of the cutter head or the shear bar as occurs when the rotatable knives and shear bar are mounted in parallel relationship with each other. It also is conventional at present to include a power-driven, rotatable grinding wheel as part of the standard equipment of a forage harvester. Guide means also are included adjacent the periphery of the cutter head in order that the grinding wheel may be moved in an axial direction across the cutting edge of each knife from one end to the other while the cutter head is being rotated by the prime mover of the harvester and the grinding wheel also is rotated by power derived from said prime mover.

It is appropriate to inspect the knives of the cutter head periodically to determine whether the same need sharpening and, in addition, after the same have been either partially or completely sharpened, inspection of the individual knives likewise is desirable. At present, such inspection is undertaken manually by an operator engaging each blade and pulling the cutter head stepwise in a suitable direction to permit adequate inspection of the cutting edges and bevelled surfaces immediately rearward of the cutting edges of the knives. Due to the fact that the cutter heads are large and heavy, considerable force is required to effect such rotation of the cutter head. In addition, there is a certain amount of possible danger that an operator's hand may be cut by the edges of the knives.

For an understanding of the details of the forage harvesters in which cutter heads of the type to which the present invention pertain, as well as the mechanism for operating the same, attention is directed to prior patents U.S. Pat. No. 3,751,859, in the name of P. K. Pedersen, dated Aug. 14, 1973, U.S. Pat. No. 3,793,792, in names of R. A. Wagstaff and R. W. Waldrop, dated Feb. 26, 1974; and U.S. Pat. No. 3,863,403, in name of P. F. Fleming, dated Feb. 4, 1975. In all of said previous patented structures, inspection of the cutter head is effected usually manually. In addition, said patents disclose cutter heads in which the knives are disposed at an angle to the axis of the cutter head, somewhat in a skewed manner, and guide means for the grinding wheels shown in said patents also is illustrated therein and it is to be noted that particularly in the first two patents auxilary means is required to effect desired biasing forces between the knives of the cutter head and the grinding wheel, said auxilary mechanism being somewhat awkward to manage as well as being provided solely for purposes of effecting such biasing action and not performing any other useful function incident to any other operational characteristics of the machine.

SUMMARY OF THE INVENTION

It is the principal purpose of the present invention to provide manually operable means which are safe to operate for purposes of sequentially advancing the various knives of the cutter head of a forage harvester in a direction to permit safe and ready inspection of the knives, such mechanism including a manually operable handle which is positioned exteriorly of the housing for the cutter head, the sides of which are immediately adjacent opposite ends of the cutter head, said handle actuating a pawl which is engagable with a ratchet wheel which is non-rotatably connected to the cutter head.

It is another object of the invention to provide a compression spring which is placed under compressive force when the aforementioned handle is moved in one direction and, when the handle is released, the forces generated in the spring actuate the handle in a reverse direction and the pawl on said handle engages the aforementioned ratchet wheel to advance the cutter head one increment of movement, whereby sucessive operations of said handle in one direction energize the spring and additional incremental movements of the ratchet wheel and cutter head are effected by the energy stored in the spring as a result of each such initial movement of the handle.

A still further object of the invention is to arrange the co-engagement of the pawl with the ratchet wheel in such manner that if the prime mover is inadvertently started and causes rotation of the cutter head in cutting direction, the pawl will automatically disengage the ratchet wheel which at all times is fixed to the cutter head and is rotatable therewith, whereby no damage will be sustained by the inspection mechanism.

One further object of the invention is to utilize the aforementioned spring power to perform an additional function, namely, to bias the diagonally arranged knives on the cutter head toward the grinding wheel as it rotates and is moved axially, back and forth, between opposite ends of each knife, the grinding wheel being guided by anti-friction members carried by the head which supports the grinding wheel, said anti-friction members rotating along the cutting edges of the knives while the grinding wheel re-bevels the surfaces of the knives immediately rearward of the cutting edges. Details of the foregoing objects and of the invention, as well as other objects thereof, are set forth in the following specification and are illustrated in the accompanying drawings comprising a part thereof.

BRIEF DESCRIPTION OF THE DRAWINGS

FIG. 3 is a fragmentary vertical sectional view showing details of the grinding mechanism, as seen along the line 3—3 of FIG. 2.

FIG. 4 is a fragmentary vertical sectional view showing details of part of the actuating mechanism for the grinding mechanism, as seen along the line 4—4 of FIG. 1.

FIG. 5 is a fragmentary side elevation of the mechanism shown in FIG. 4 and also as seen along the line 5—5 of FIG. 2, the views in both FIGS. 4 and 5 being shown upright on the sheet to accommodate them thereto whereas in the actual position thereof on the machine they extend diagonally as shown in FIG. 1.

DETAILED DESCRIPTION

Figure 1:
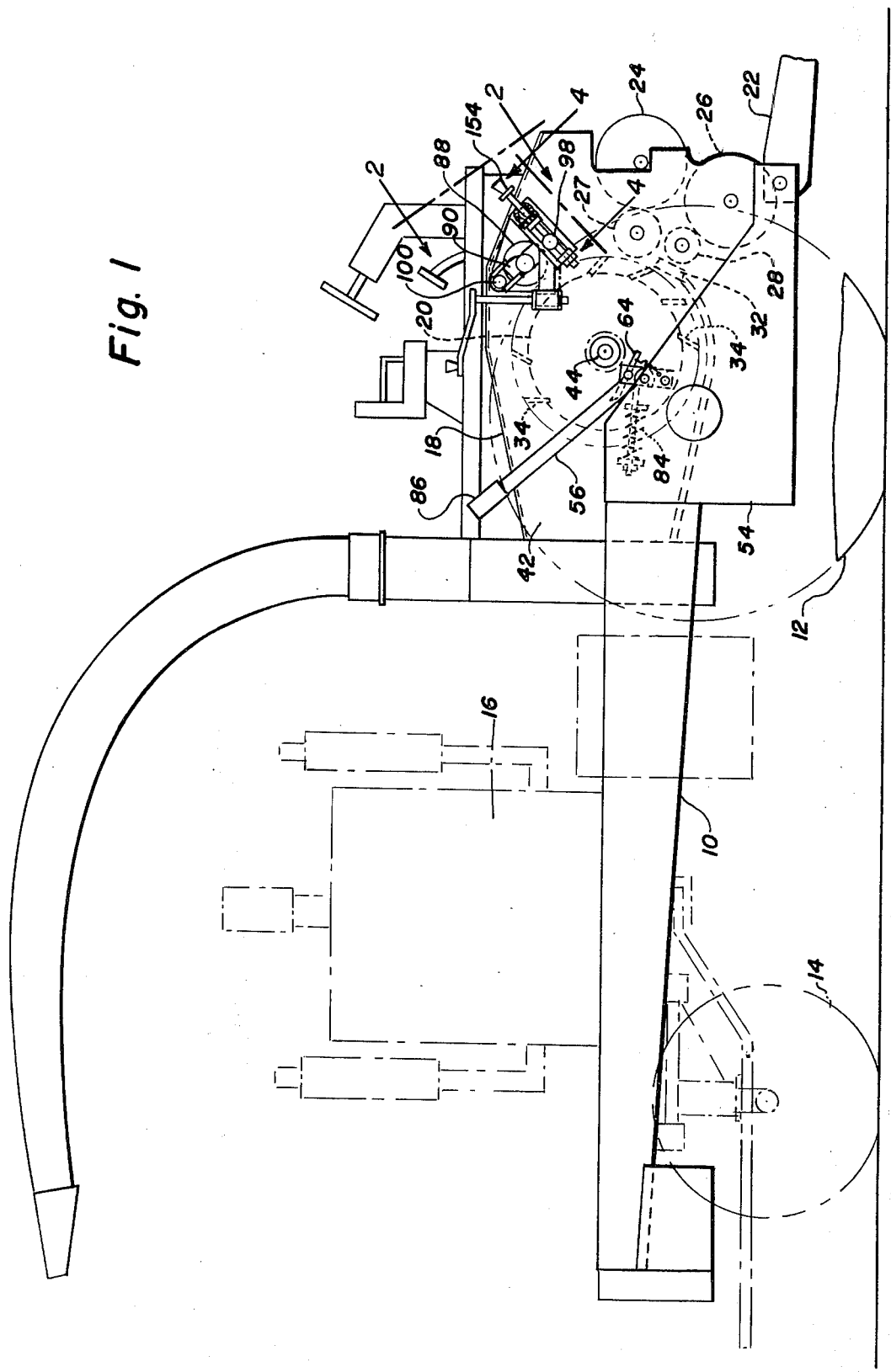
FIG. 1 is a side elevation of an exemplary forage harvester of the type to which the present invention pertains, part of the units of said harvester being illustrated in phantom.

Referring to FIG. 1, an exemplary forage harvester of the type to which the present invention pertains is shown in side elevation. Said harvester is of the mobile type and includes a frame 10, a pair of forward driving wheels 12 and one or more rear wheels 14. The prime mover 16 is a heavy duty Diesel engine of suitable power rating.

At the forward end of the frame 10 is a housing 18 within which a rotatable cutter head 20 is contained, the same being driven by suitable transmission and drive means, not shown, which is connected to the prime mover 16 in conventional manner. Such drive mechanism comprises no part of the present invention per se. A suitable header, not shown, is connected to the forward end of the housing 18 and is supported by arm means 22 which is shown fragmentarily in FIG. 1. The header cuts and delivers crop material which is to be chopped in small pieces by the cutter head 20. The cut material is delivered to a first pair of feed rolls 24 and 26 and then to a second pair of feed rolls 27 and 28 which directly feed the cut material between a fixed, horizontally extending shear bar 32 and the knives 34, of which a plurality thereof are supported by the cutter head 20 in evenly spaced circumferential distances, the knives 34 having a sharpened edge which co-acts in shearing relationship with the cutting edge of the shear bar 32 in conventional manner in forage harvesters of the type described.

Figure 2:
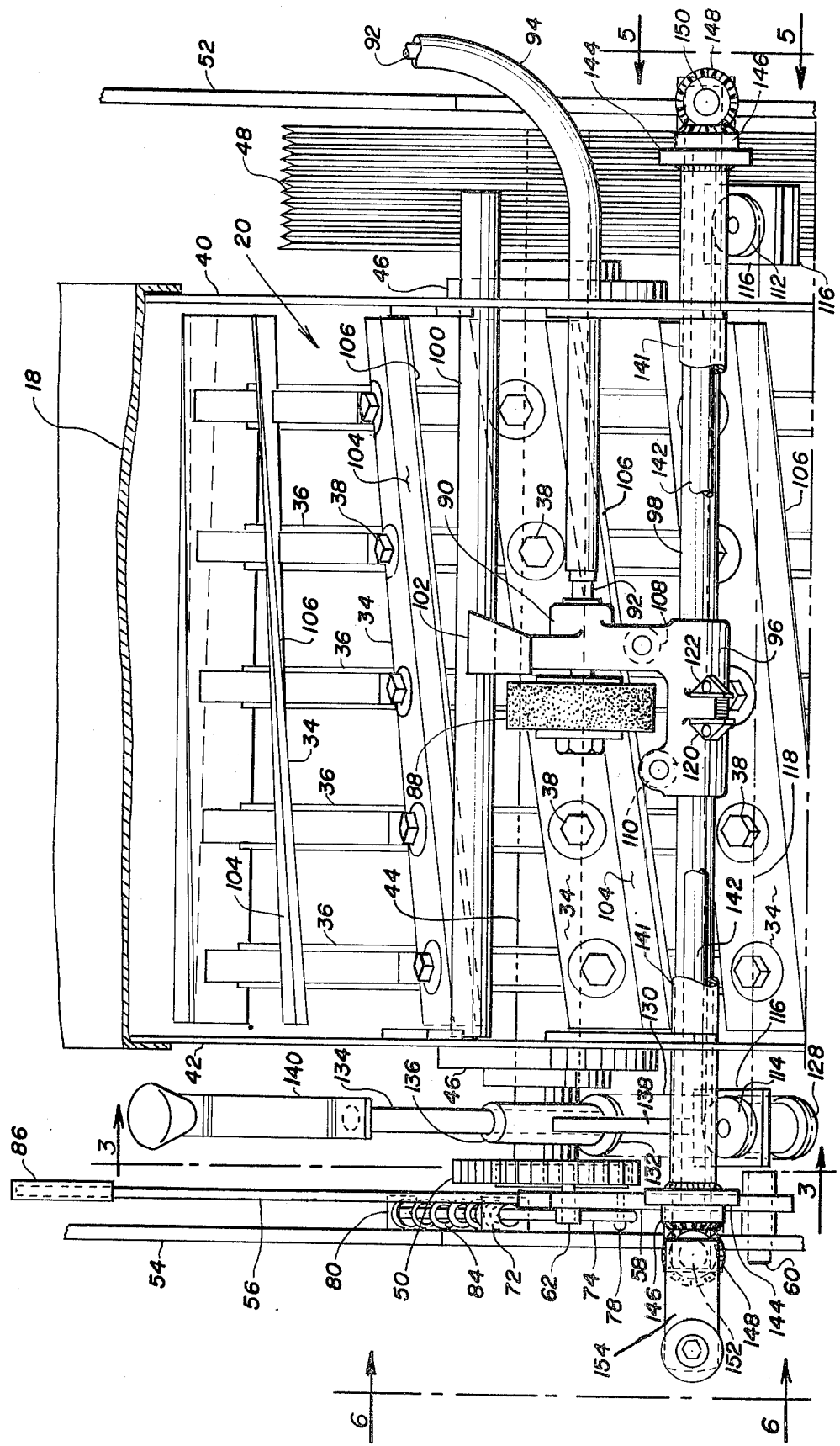
FIG. 2 is an elevation of the cutter head area of the harvester shown in FIG. 1 as seen on the line 2—2 thereof, the same being illustrated on a substantially larger scale than employed in FIG. 1 and the cover which normally overlies the cutter head being broken away along a section line.

Referring to FIG. 2, it will be seen that the cutter head 20 comprises a plurality of spiders or discs 36 to which the knives 34 are connected by conventional bolts 38 and it will be seen that the knives 34 extend at an acute angle to the axis of the cutter head 20. Further, as also shown in FIG. 2, the knives 34 are skewed and the cutting edges 38 thereof all extend in the same direction relative to the circumference of the cutter head 20. Also as shown in FIG. 2, the housing 18 has side plates 40 and 42 adjacent the opposite ends of the cutter head 20.

The spiders or discs 36 are fixed in axially spaced relationship to a drive shaft 44 which is supported adjacent opposite ends thereof within appropriate bearings 46. Connected to the right hand end of drive shaft 44, as seen in FIG. 2, is a multiple-grooved sheave 48 of large diameter which is driven by another sheave that is suitably connected by means, not shown, to the prime mover 16. Fixed to the opposite end of drive shaft 44 is a ratchet gear 50 which comprises an essential part of the present invention. It will be understood that the means by which the large sheave 48 is driven is connected to the prime mover 16 through an appropriate clutch and operating mechanism which permits the same to assume a neutral position in which the sheave 48 is disconnected from the prime mover 16 in order that the cutter head 20 may be moved incrementally for inspection of the knives 34 for example. Such incremental movement is effected by stepwise actuation of ratchet gear 50 and this is achieved by the following mechanism.

The frame 10, at the forward end of the machine, supports additional side plates 52 and 54 which are spaced outwardly from the side plates 40 and 42 comprising opposite sides of the housing 18 which contains the cutter head 20. The ratchet gear 50 is disposed between the side plates 42 and 54, as is also the following mechanism by which the ratchet gear is actuated to advance the cutter head 20 stepwise. Manually operable arm 56 has a lower end portion 58 which is offset at an angle to the upper portion of the arm and the lower end of the lower end portion 58 is supported upon a pivot 60 which is fixed to and extends inwardly from side plate 54 as best shown in FIG. 2.. The upper part of the lower end portion 58 is provided with a pintle 62 which supports a pawl 64 intermediately of the ends thereof, as clearly shown in FIGS. 6–8. A spring 66 is connected at one end to the lower end portion 58 and the opposite end is connected to the end of the pawl 64 which is opposite the sharpened end 68 that engages the teeth of the ratchet wheel 50, said spring normally biasing the sharpened end 68 of the pawl in a direction to engage the teeth of the ratchet gear but such movement is limited by a pawl stop 70 which is fixed to the lower end portion 58 as best shown in FIG. 6.

Side plate 54 also supports a stop or bracket 72 which is fixed relative to the axis of drive shaft 44. Said bracket is apertured to receive a J-rod 74, the curved end 76 thereof extending around a pin 78 which is fixed to the lower end portion 58 of the handle arm 56. The opposite end of J-rod 74 from the curved end 76 thereof has an apertured abutment 80 connected thereto and a pair of nuts 82 are threaded upon said opposite end of the J-rod 74 outwardly from the abutment member 80 to effect a desirable degree of pressure upon a coiled compression spring 84. It will be seen that the compression spring 84 extends between the bracket 72 and abutment member 80. Normally, the spring is under a limited amount of compression force due to the tension imposed thereon by the adjustment of the nuts 82 relative to abutment member 80.

Figure 6:
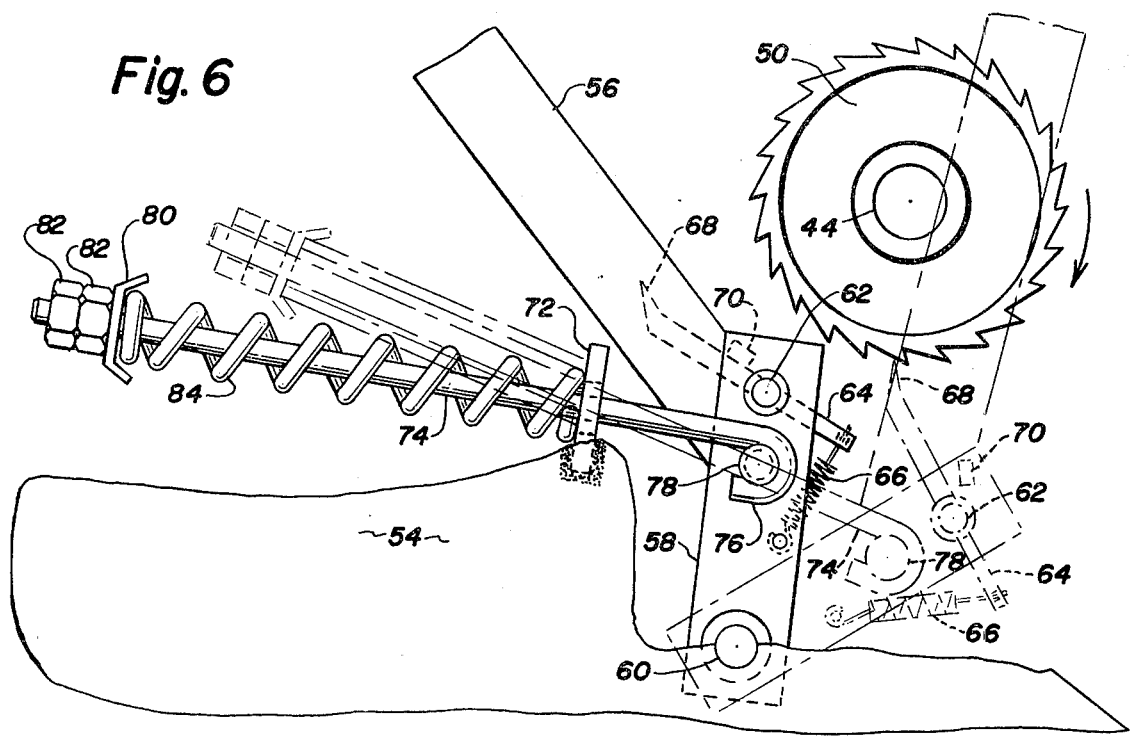
FIG. 6 is a fragmentary enlarged side elevation of the mechanism for advancing the cutter head, as seen on the line 6—6 of FIG. 2.

During the time the cutter head 20 is being driven in cutting operation by the prime mover 16, the handle arm 56 and the mechanism associated therewith is in the position shown in FIG. 6 which is the inoperative position. The pawl 68 is retracted from the ratchet wheel 50 in this position, whereby the ratchet wheel is free to revolve with the cutter head 20 and the force of the spring 84 normally will maintain said mechanism in the position shown in FIG. 6. When, however, it is desired to inspect the cutter head 20 and especially the individual knives 34 thereon, the handle arm 56 is moved from the idle position shown in FIG. 6, clockwise, to the phantom position shown in FIG. 6, wherein it will be seen that the sharpened end 68 of the pawl 64 is brought into engagement between a pair of successive teeth of the ratchet gear 50, thus moving the pawl 64 out of engagement with the stop 70. Such movement also compresses the spring 84 to cause the same to exert greater than normal pressure when the latter is expanded as shown in FIG. 6 for example. Accordingly, at the completion of the clockwise movement of the handle arm 56 to the phantom position shown in FIG. 6, said handle arm is released by the operator and the force of the spring 84 then is free to expand and move the handle arm 56 from the position shown at the left hand end of FIG. 7 for example, to the position shown at the left hand end of FIG. 8, thereby causing the ratchet gear 50 to move a certain increment of distance about the axis of shaft 44, correspondingly moving the cutter head 20 clockwise, as viewed in FIGS. 6–8, through a corresponding rotary angle and thus bring one or more of the knives 34 into position to be intimately viewed by the operator who is conducting the inspection. The above-described procedure may be repeated as often as necessary to provide a complete inspection of all of the knives 34 and it will be seen that such operation is performed solely through manipulation of the handle arm 56, the outer end 86 of which, see FIG. 2, preferably is in the form of a suitable grip which, as shown in FIG. 1, projects above the upper edge of side plate 54 for ready engagement by the operator. Hence, a complete inspection of the cutter head 20 may be achieved in a completely safe manner without the operator being required to engage the knives 34 either to advance the cutter head 20, as now required in current machines, or otherwise.

As indicated hereinabove the forces imposed upon the cutter head 20 by the spring 84 incident to the same rotating the ratchet gear 50 through a predetermined increment of rotary distance is employed for an additional purpose, whereby the spring 84 serves a dual role in the present invention. This second function of the spring comprises the feature of imparting tension upon the various knives 34 of the cutter head 20 in a direction to urge the same into contact by the grinding wheel 88 as the same traverses each knife 34 for the full length thereof, the opposite ends of said traverse being illustrated respectively in FIGS. 7 and 8, in the right hand portion of each of said figures. The grinding wheel 88 is carried by a traversing head 90, details of which are best illustrated in FIG. 2. The grinding wheel 88 is supported upon one end of a flexible shaft 92 which is rotatable within a flexible sleeve 94, the opposite end of the flexible shaft 92 being connected by a suitable means, not shown, such as a clutch, to the prime mover 16. The traversing head 90 is provided with a guide sleeve 96 which is slidably supported by a transverse tube or rod 98 which extends through opposite side plates 40 and 42 of the cutter head housing 18. Another guide rod 100, best shown in FIG. 2, also extends between side plates 40 and 42 and is parallel to guide rod 98. From FIG. 3, it will be seen that the upper end 102 of traversing head 90 is concaved and is complementary to the exterior surface of guide rod 100 for slidable engagement therewith. Hence, it will be seen that the guide rods 98 and 100 effectively guide the traversing head 90 between opposite ends thereof and thereby carry the grinding wheel 88 effectively along the slightly concaved bevel surfaces 104 which are immediately rearward of the sharpened cutting edges 106 on the leading edge of each of the knives 34.

Figure 7:
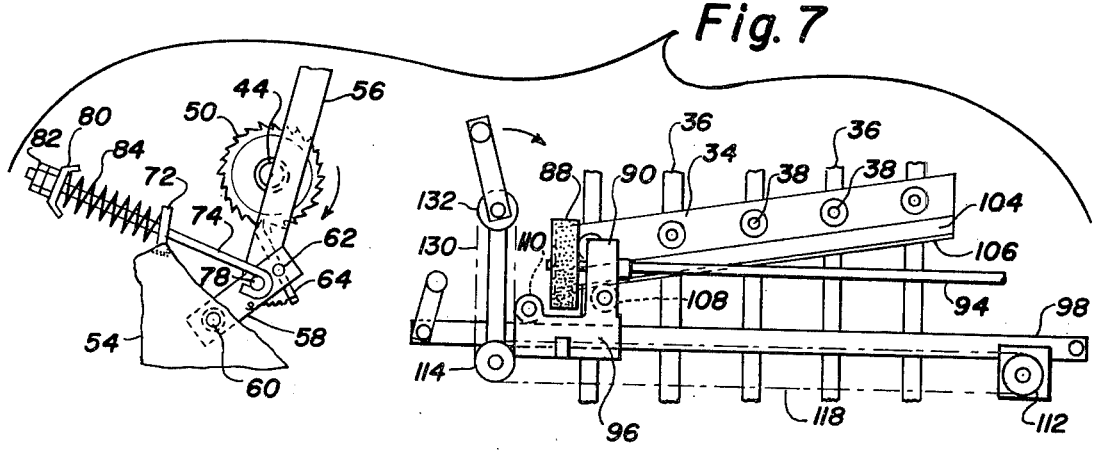
FIG. 7 is an exploded view showing at the left, fragmentarily, and somewhat diagrammatically, the biasing force imposed upon the cutter head by the ratchet wheel in order to urge the knife illustrated at the right hand side of the figure, fragmentarily, into engagement with the grinding wheel, said wheel being illustrated adjacent one end of the knife in said figure.
Figure 8:
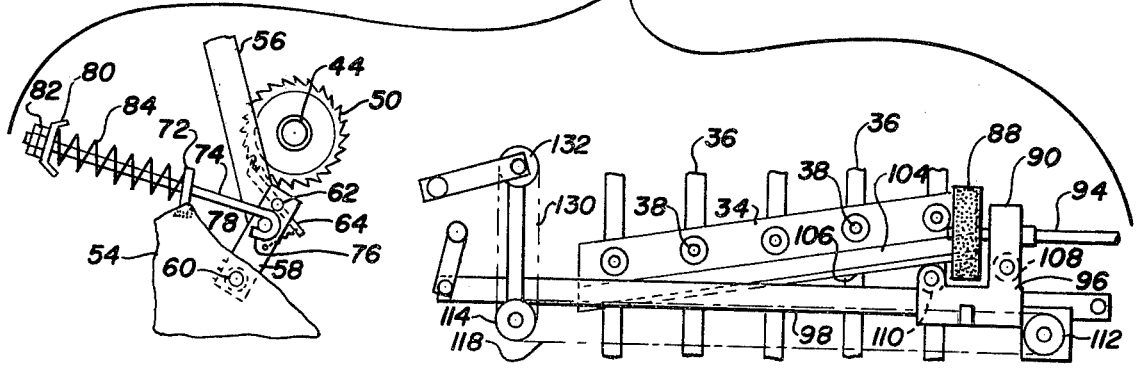
FIG. 8 is another view similar to FIG. 7 but showing the grinding wheel at the opposite end of the knife and, at the left, the biasing means being shown in a more advanced position then in the corresponding mechanism illustrated at the left in FIG. 7.

The guide sleeve 96 is also provided with a pair of guide rollers 110 and 108, preferably of an anti-friction nature, which are engagable with the cutting edges 106 of each blade while the bevel surface 104 thereof is being ground by the grinding wheel 88. As shown in FIGS. 2, 7 and 8, all of the knives 34 are disposed at similar acute angles to the axis of the cutter head 20, thereby extending diagonally to the guide sleeve 98 and guide rod 100. Hence, assuming that the starting position of the grinding wheel 88 is as indicated in FIG. 8, as the guide sleeve 96 moves to the left as viewed in said figure, the guide rollers 108 and 110 will ride along the sharpened cutting edge 106 of the knife 34 and bias the same upwardly as viewed in FIG. 8, against the action of the force imposed upon the cutter head, and correspondingly upon the knives 34 thereof, by the spring 84 which, by means of the pawl 64, urges the ratchet wheel 50 in a clockwise direction as viewed in FIG. 6, to effect such tensioning of the knives 34 relative to the grinding wheel 88.

The guide sleeve 96 and the grinding wheel 88 carried thereby are moved in traversing manner along the guide sleeve 96 and the guide rod 100 by manually operated means comprising a pair of sprocket gears 112 and 114 supported upon suitable brackets 116, best shown in FIG. 2, and around which a flexible member such as chain 18 extends. One end of the chain is secured to ear 120 on guide sleeve 96, see FIG. 2, and the opposite end thereof is secured to ear 122 on guide sleeve 96.

Referring to FIG. 3, wherein sprocket gear 114 is shown supported on the upper end of a shaft 24 mounted in guide sleeve 126, there is illustrated another small sprocket gear 128 fixed to the lower end of shaft 124 and around which another short sprocket chain 130 extends for driving operation by still another small sprocket gear 132 which is mounted on the lower end of shaft 134 which is supported in guide sleeve 136 which is carried by a plate 138 that is connected to bracket 116 as can be seen from FIG. 2. The upper end of shaft 134 has a crank handle 140 fixed thereto. As the crank handle 140 is slowly turned, the guide sleeve 96 is moved progressively between opposite sides of the housing for the cutter head 20, successively in engagement with the various knives of the cutter head for purposes of suitably grinding the bevelled surfaces 104 therein respectively immediately rearward of the sharpened cutting edges 106 on said knives.

For purposes of adjusting the position of the grinding wheel 88 in a radial direction toward the bevelled surfaces 104 of the knives 34, attention is directed particularly to FIGS. 1, 2, 4 and 5. A transverse tube 4 extends between and through openings in side plates 40 and 42 and a shaft 142 is rotatable co-axially therein, the opposite ends of which rotate within appropriate bearings adjacent the outer ends of the transverse tube 141. The opposite ends of the tube 141 are welded to appropriate brackets 144. Secured to the opposite ends of shaft 142 are similar bevel gears 146 which respectively mesh with additional bevel gears 148 which are fixed to shafts 150 and 152, shaft 152 being longer than shaft 150 and having a manually operable crank handle 154 on the upper end thereof. The shafts 150 and 152 are oppositely threaded and extend through threaded holes 156 in the opposite ends of shaft 98. Brackets 144 each have a slot 158 therein, see FIG. 5, which accommodate the opposite ends of shaft 142 respectively, the threads of the holes 156 respectively being complementary to those on the shafts 150 and 152.

The shafts 150 and 152 are supported within suitable short brackets 160 and 162 which are fixed to the brackets 144 and appropriate locking collars 164 are fixed to the shafts adjacent the brackets 160 and 162 to prevent axial movement of the shafts 150 and 152 relative to said brackets. Hence, when the crank handle 154 is rotated in either direction, it will correspondingly move the opposite ends of shaft 142 simultaneously in the same direction due to the fact that the threads on shafts 150 and 152 respectively are left handed and right handed as is clearly evident from FIGS. 4 and 5. Also, due to the fact that the shaft 142, which is rotated by the bevel gears 146 and 148 shown in FIG. 4, as actuated by crank handle 154, also will operate the bevel gears 146 and 148 at the opposite end of shaft 142 which are at the opposite sides of the housing for the cutter head 20. As a result of this, the transverse tube 98 which supports the guide sleeve 96 will be moved toward or from the axis of the cutter head 20 and thereby correspondingly move the grinding wheel 88 toward or from the bevel surfaces 104. Obviously, as the grinding wheel 88 rotates and grinds a certain length of bevelled surfaces, it will wear and, accordingly, the grinding wheel will have to be gradually adjusted inwardly toward the knives as such wear occurs in order to effect similar grinding of all of the bevelled surfaces 104. This can readily be accomplished by actuating the crank handle 154, even while the grinding operation is in progress and as can be visualized from FIG. 2, such adjustment is effected from the exterior of the machine so that no harmful results can arise to the operator.

Further, referring to FIG. 6, it will be seen that the biasing of the sharpened end 68 of pawl 64 toward ratchet gear 50 is in a direction that, if inadvertently or otherwise, the drive for cutter head 20 is thrown into gear for actuation by the prime mover 16, the pawl 64 automatically will be inoperative because of the direction of rotation of the ratchet gear 50. Also, normally, the handle arm 56 will be in the inoperative, full line position shown in FIG. 6, wherein pawl 64 also is inoperative, whereby it will be seen that the entire operation of the machine is of a safe type, both from the standpoint of the operator as well as the equipment per se.

From the foregoing, it will be seen that the spring-operated means for moving the cutter head 20 incrementally to provide safe inspection of the knives, said spring means also afford means for biasing the knives of the cutter head in a direction to be effectively engaged by the grinding wheel 88 while grinding the bevel surfaces 104 on said knives. Further, it is to be understood that the grinding wheel 88 may also be employed to sharpen the grinding edges 106 of the knives 34 simply by bringing the periphery of the grinding wheel into position to contact the cutting edges 106 while the cutter head 20 is rotated in normal manner by the prime mover 16. The same means employed to move the grinding wheel 88 in traversing direction relative to knives 34 incident to grinding the bevel surfaces 104 likewise may be employed to move the grinding wheel 88 in traversing manner with respect to the cutting edges 106.

While the invention has been described and illustrated in its several preferred embodiments, it should be understood that the invention is not to be limited to the precise details herein illustrated and described since the same may be carried out in other ways falling within the scope of the invention as illustrated and described.

I claim:

1. In a forage harvester of the type having a frame, a shear bar mounted stationarily upon said frame, a cutter head mounted upon said frame rotatably and having a plurality of circumferentially spaced knives on the periphery thereof which coact with said shear bar in shearing relationship to cut crop material conveyed thereto within said harvester, and power means connectable to said cutter head to rotate it in shearing direction relative to said shear bar, the improvement comprising means operable manually to rotate said cutter head stepwise for inspection of the knives thereof, said means comprising in combination, a toothed ratchet wheel, means connecting said ratchet wheel to said cutter head, a handle supported at one end by said frame and the other end being engageable manually for movement thereof, and a pawl on said handle engageable with the teeth of said rachet wheel when said handle is moved in one direction, thereby to advance said cutter head and the knives thereon incrementally to permit visual inspection of said knives on said cutter head.

2. The improvement in a forage harvester in accordance with claim 1 further including spring means interconnected to said handle and operable to move said handle in said one direction to advance said cutter head incrementally to afford inspection of said knives of said head.

3. The improvement in a forage harvester in accordance with claim 2 further including a rod connected at one end to said handle, a stop member fixed to said frame and having a hole through which said rod extends, said spring being a compression coiled spring surrounding said rod and extending between said stop and the outer end of said rod, whereby when said handle is pivotally moved manually in the opposite direction to said one direction said spring is compressed to produce force therein and when said handle is released from manual engagement the force produced on said spring moves said rod in a direction to move said handle in said one direction and thereby advance said cutter head an increment of a revolution solely through activation of said handle by said spring.

4. The improvement in a forage harvester according to claim 3 in which said rod has a hook on one end and said handle has a lug engaged by said hook to interconnect said rod and handle, and said pawl being pivotally connected intermediately of the ends thereof to said handle and spring-biased in one direction to engage a sharpened end on said pawl with said ratchet wheel.

5. The improvement in a forage harvester according to claim 3 in which said cutter head is fixed to and supported for rotation upon a shaft carried by said frame of said harvester, and said improvement further including means fixing said ratchet wheel to said shaft, and said frame of said harvester further including an outer side plate and a housing including side plates respectively adjacent opposite ends of said cutter head, and said ratchet wheel and handle-operating mechanism of said improvement being disposed between said outer side plate and one of said side plates of said housing for protection purposes.

6. The forage harvester according to claim 1 in which the knives of said cutter head are skewed relative to the axes of said head and said harvester further including a grinding wheel on a head to grind the cutting edges and re-bevel the knives of said cutter head adjacent the sharpened edges thereof, means to rotate said wheel, means to move said wheel longitudinally along the cutting edges of said knives while being rotated, a guide bar supported by said frame and extending transversely between opposite ends of and parallel to the axis of said cutter head adjacent the peripheral path of said knives of said head and slidably supporting said grinding wheel head, and follower means on said grinding wheel head movable along the cutting edges to cause said cutter head to be rotated in accordance with the skew of the knives of said head as the wheel of said grinding head moves along the cutting edges of said knives to grind re-bevelled surfaces thereon, and said improvement further including spring means interconnected to said handle and operable to move said handle in said one direction to bias said rachet wheel and cutter head in opposition to the rotation of said head by the movement of said grinding wheel head along the cutting edges of the knives of said cutter head and thereby provide pressure to urge said knives toward said grinding wheel of said grinding wheel head for effective grinding of said re-bevelled surfaces on said cutting edges.

7. The improvement in a forage harvester according to claim 6 further including a rod connected at one end to said handle, a stop member fixed to said frame and having a hole through which said rod extends, said spring being a compression coiled spring surrounding said rod and extending between said stop and the outer end of said rod, whereby when said handle is pivotally moved manually in the opposite direction to said one direction said spring is compressed to produce force therein and when said handle is released from manual engagement the force produced on said spring moves said rod in a direction to move said handle in said one direction and thereby advance said cutter head an increment of a revolution solely through activation of said handle by said spring.

* * * * *